United States Patent
Kim et al.

(10) Patent No.: US 11,436,308 B2
(45) Date of Patent: Sep. 6, 2022

(54) ELECTROMYOGRAM SIGNAL-BASED USER AUTHENTICATION APPARATUS AND METHOD

(71) Applicant: Industry-Academic Cooperation Foundation, Chosun University, Gwangju (KR)

(72) Inventors: Youn Tae Kim, Daejeon (KR); Jae Hyo Jung, Gwangju (KR); Si Ho Shin, Gwangju (KR); Min Gu Kang, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 253 days.

(21) Appl. No.: 16/870,251

(22) Filed: May 8, 2020

(65) Prior Publication Data
US 2021/0117523 A1    Apr. 22, 2021

(30) Foreign Application Priority Data
Oct. 22, 2019  (KR) ........................ 10-2019-0131278

(51) Int. Cl.
  *G06F 21/32*   (2013.01)
  *G06N 20/10*   (2019.01)
  *G06F 3/01*    (2006.01)

(52) U.S. Cl.
  CPC .............. *G06F 21/32* (2013.01); *G06F 3/015* (2013.01); *G06N 20/10* (2019.01)

(58) Field of Classification Search
  CPC ....... A61B 5/117; A61B 5/7246; A61B 5/349; H04L 63/0861
  See application file for complete search history.

(56) References Cited

U.S. PATENT DOCUMENTS

| | | | |
|---|---|---|---|
| 11,045,137 B2 * | 6/2021 | Barbre ................. | A61B 5/6801 |
| 2005/0114654 A1 * | 5/2005 | Brackett ................. | G06F 21/35 713/161 |
| 2007/0027388 A1 * | 2/2007 | Chou .................. | A61B 5/0002 600/382 |
| 2007/0149892 A1 * | 6/2007 | Guldalian ............ | A61B 5/4041 600/554 |

(Continued)

FOREIGN PATENT DOCUMENTS

| | | | |
|---|---|---|---|
| CA | 2868706 A1 * | 10/2013 | ........... A61B 5/0488 |
| KR | 10-2016-0009741 A | 1/2016 | |

OTHER PUBLICATIONS

Ahmad et al., Multiclass Myoelectric Identification of Five Fingers Motion using Artificial Neural Network and Support Vector Machine, 2017, Advances in Science, Technology and Engineering Systems Journal vol. 2, No. 3, 1026-1033 (Year: 2017).*

*Primary Examiner* — William Lu
(74) *Attorney, Agent, or Firm* — Studebaker & Brackett PC

(57) ABSTRACT

Provided is an electromyogram (EMG) signal-based user authentication apparatus and method. The apparatus includes an EMG signal receiver configured to receive an EMG signal measured using an EMG sensor, a pre-processor configured to remove a partial signal from the received EMG signal according to a preset frequency band, and a controller configured to authenticate a user by comparing a pre-stored EMG signal with the EMG signal in which the partial signal has been removed.

14 Claims, 8 Drawing Sheets

(56) References Cited

U.S. PATENT DOCUMENTS

| | | | |
|---|---|---|---|
| 2008/0188762 A1* | 8/2008 | John | A61B 5/349 |
| | | | 600/513 |
| 2014/0165184 A1* | 6/2014 | Lange | G06F 21/32 |
| | | | 726/19 |
| 2014/0300554 A1* | 10/2014 | Samuel | H04W 12/068 |
| | | | 345/173 |
| 2016/0191517 A1* | 6/2016 | Bae | A61B 5/117 |
| | | | 726/7 |
| 2019/0001129 A1* | 1/2019 | Rosenbluth | A61N 1/08 |
| 2019/0310707 A1* | 10/2019 | Hwang | G06F 3/165 |
| 2019/0369726 A1* | 12/2019 | Kang | G02B 27/017 |
| 2020/0065569 A1* | 2/2020 | Nduka | G02B 27/017 |
| 2020/0285873 A1* | 9/2020 | Condon | G06K 9/00536 |
| 2020/0289016 A1* | 9/2020 | Lukyanenko | A61B 5/296 |
| 2020/0310539 A1* | 10/2020 | Barachant | G06F 3/015 |

\* cited by examiner

ELECTROMYOGRAM SIGNAL-BASED USER AUTHENTICATION APPARATUS AND METHOD

CROSS-REFERENCE TO RELATED APPLICATION

This application claims priority to and the benefit of Korean Patent Applications No. 10-2019-0131278, filed on Oct. 22, 2019, the disclosures of which are incorporated herein by reference in its entirety.

BACKGROUND

1. Field of the Invention

The present invention relates to an electromyogram (EMG) signal-based user authentication apparatus and method, and more specifically, to an EMG signal-based user authentication apparatus and method that authenticate a user by extracting parameters from an EMG signal and comparing the extracted parameters with pre-stored parameters.

2. Discussion of Related Art

Recently, as interest in health and convenience is increasing, bio-signal measurement, communication, and sensor technologies have been rapidly developing. An amount of exercise is calculated using a bio-signal, individuals are authenticated with fingerprints, or objects are controlled through gestures. Such a bio signal is measured anytime and anywhere and provides convenience because a part of the body is used as a password.

However, with the development of science technology, the number of bio-signal exploits is increasing. For example, there is a case in which fingerprints and irises are copied, or passwords are hacked and thus others acquire personal information and obtain unfair profits.

The EMG-based personal authentication system according to the related art is inconvenient to use due to the large size and has a low utilization due to only having a personal authentication function.

RELATED ART DOCUMENT

Patent Document
(Patent Document 1) [Patent Document 1] Korean Laid-open Patent Publication No. 10-2016-0009741 (Jan. 27, 2016)

SUMMARY OF THE INVENTION

The present invention provides an electromyogram (EMG) signal-based user authentication apparatus and method.

The technical objectives of the present invention are not limited to the above, and other objectives may become apparent to those of ordinary skill in the art based on the following description.

According to one aspect of the present invention, there is provided a user authentication apparatus including an EMG signal receiver configured to receive an EMG signal measured using an EMG sensor, a pre-processor configured to remove a partial signal from the received EMG signal according to a preset frequency band, and a controller configured to authenticate a user by comparing a pre-stored EMG signal with the EMG signal in which the partial signal has been removed.

The EMG signal may be a signal measured using the EMG sensor including two channels and a wet-type electrode coated with a gel containing a hydrogel component.

The controller may derive parameters for analyzing the EMG signal in which the partial signal has been removed and compare result values of the derived parameters with reference values of parameters of the pre-stored EMG signal to authenticate the user.

The controller may input the result values of the derived parameters into a model combining an Artificial Neural Network (ANN) and a Support Vector Machine (SVM) to classify and store the result values of the derived parameters.

The parameters may include a first parameter, a second parameter, a third parameter, a fourth parameter, and a fifth parameter, wherein the first parameter may be a parameter related to an area of the EMG signal, the second parameter may be a parameter related to a length of EMG signal waveforms accumulated for a predetermined time, the third parameter may be a parameter related to an effective value of the EMG signal, the fourth parameter may be a parameter related to a cumulative value of a square value of the EMG signal, and the fifth parameter may be a parameter related to a variance value of the EMG signal.

According to another aspect of the present invention, there is provided a user authentication method including an EMG signal reception operation of receiving an EMG signal measured using an EMG sensor, a pre-processing operation of removing a partial signal from the received EMG signal according to a preset frequency band, and a user authentication operation of comparing a pre-stored EMG signal with the EMG signal having the partial signal removed to authenticate a user.

The EMG signal may be a signal measured using the EMG sensor including two channels and a wet-type electrode coated with a gel containing a hydrogel component.

The user authentication operation may include deriving parameters for analyzing the EMG signal in which the partial signal has been removed and comparing result values of the derived parameters with reference values of parameters of the pre-stored EMG signal to authenticate the user.

The user authentication operation may include inputting the result values of the derived parameters into a model combining an Artificial Neural Network (ANN) and a Support Vector Machine (SVM) to classify and store the result values of the derived parameters.

The parameters may include a first parameter, a second parameter, a third parameter, a fourth parameter, and a fifth parameter, wherein the first parameter may be a parameter related to an area of the EMG signal, the second parameter may be a parameter related to a length in which EMG signal waveforms are accumulated for a predetermined time, the third parameter may be a parameter related to an effective value of the EMG signal, the fourth parameter may be a parameter related to a cumulative value of a square value of the EMG signal, and the fifth parameter may be a parameter related to a variance value of the EMG signal.

Details of achieving the above and other objects will become readily apparent with reference to descriptions of the following detailed embodiments when considered in conjunction with the accompanying drawings.

However, the present invention is not limited to such embodiments and may be embodied in various forms and is provided only to complete the disclosure of the present invention and assist a person of ordinary knowledge in the technical area of pending technology (hereinafter, referred to as "an ordinary skilled person") in fully understanding the scope of the present invention.

BRIEF DESCRIPTION OF THE DRAWINGS

The present invention will be described more fully hereinafter with reference to the accompanying drawings, in which exemplary embodiments of the invention are shown. The same reference numerals are intended to refer to the same or similar functions through various aspects. It should be noted, however, that the accompanying drawings show only specific typical embodiments of the present invention and are not considered to limit the scope of the present invention, and other embodiments having the same effect may be sufficiently recognized.

DETAILED DESCRIPTION OF EXEMPLARY EMBODIMENTS

While embodiments of the present invention are susceptible to various modifications and alternative forms, specific embodiments thereof are shown by way of example in the accompanying drawings and will be described in detail herein.

Various features of the invention disclosed in the claims may be better understood in view of the drawings and detailed description. The apparatuses, methods, manufacturing methods and various embodiments disclosed in the specification are provided for illustrative purposes. The disclosed structural and functional features are intended to enable those skilled in the art to implement various embodiments in detail and not to limit the scope of the invention. The terms and sentences disclosed are intended to aid in the explanation and understanding of various features of the present invention and are not intended to limit the scope and spirit of the present invention.

In the description of the embodiments, the detailed description of related known functions or constructions will be omitted herein to avoid obscuring the subject matter of the present invention.

Hereinafter, an electromyogram (EMG) signal-based user authentication apparatus and method according to an embodiment of the present invention will be described.

Figure 1:
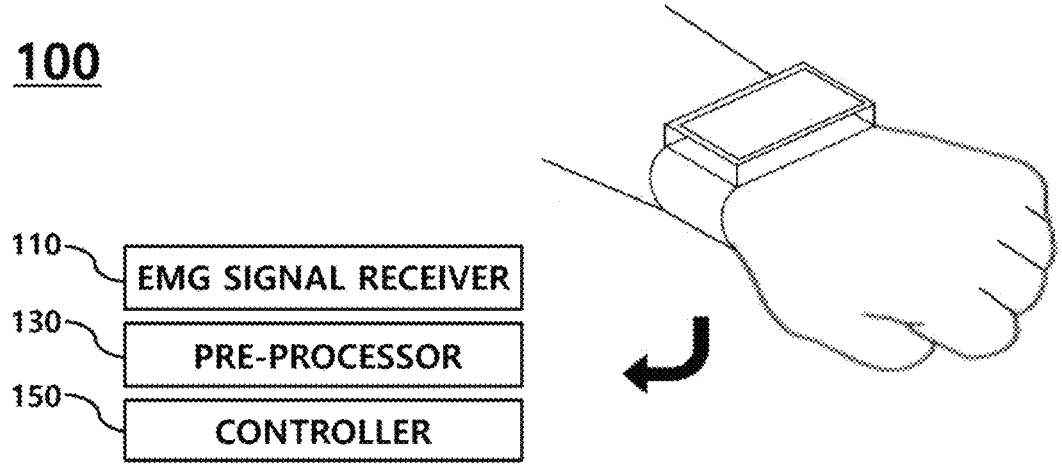
FIG. 1 is a view illustrating an electromyogram (EMG)-based user authentication apparatus for personal authentication according to an embodiment of the present invention.
Figure 2:
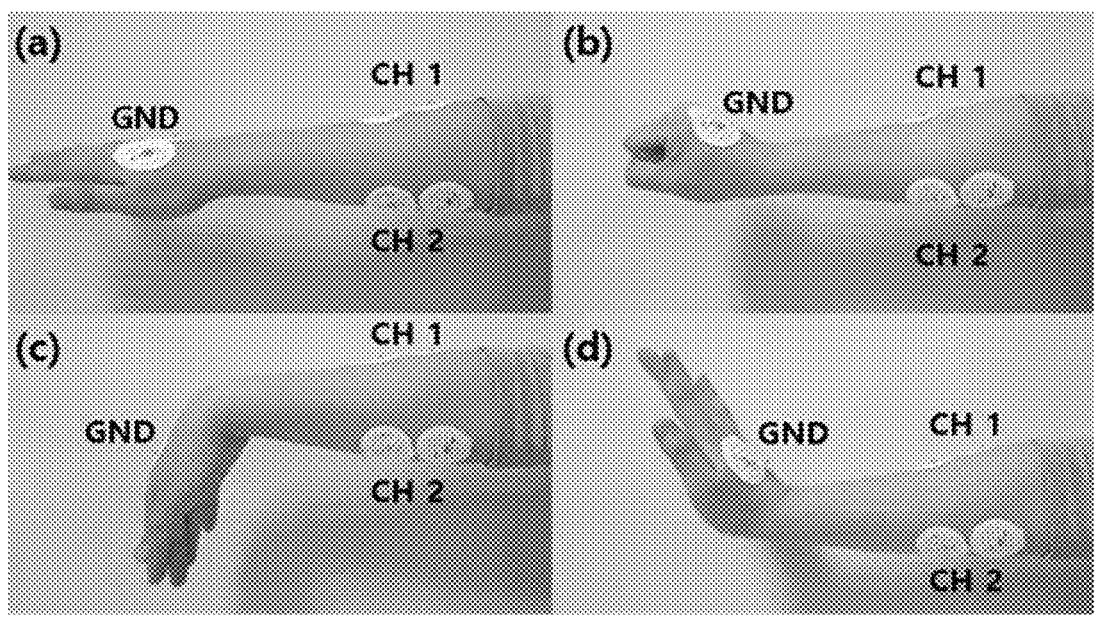
FIG. 2 is a view illustrating a state in which a wet-type electrode is attached to acquire EMG data according to an embodiment of the present invention.
Figure 3:
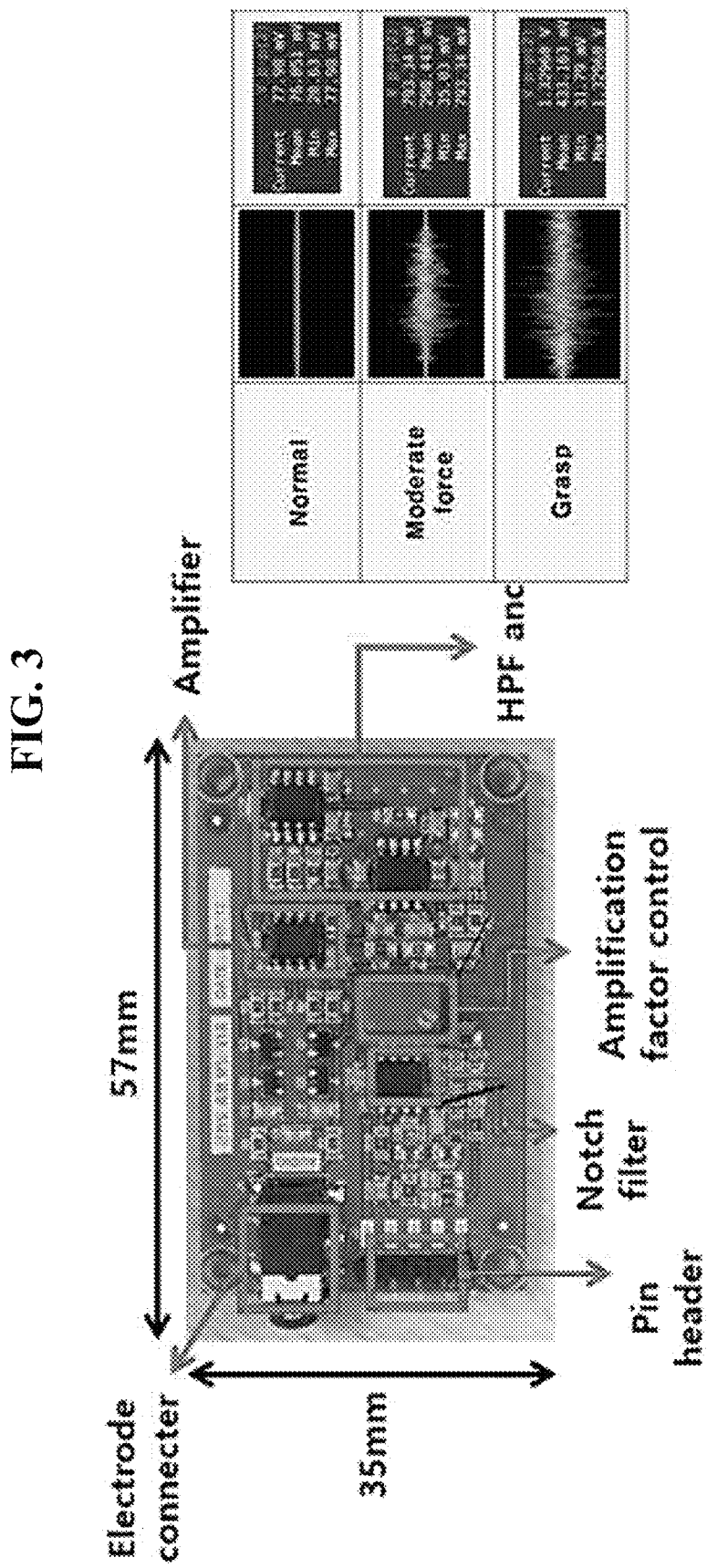
FIG. 3 is a view illustrating a module for acquiring EMG data according to an embodiment of the present invention and an EMG signal acquired from the module.

FIG. 1 is a view illustrating an EMG-based user authentication apparatus for personal authentication according to an embodiment of the present invention, FIG. 2 is a view illustrating a state in which a wet-type electrode is attached to acquire EMG data according to an embodiment of the present invention, and FIG. 3 is a view illustrating a module for acquiring EMG data according to an embodiment of the present invention and an EMG signal acquired from the module.

Figure 4:
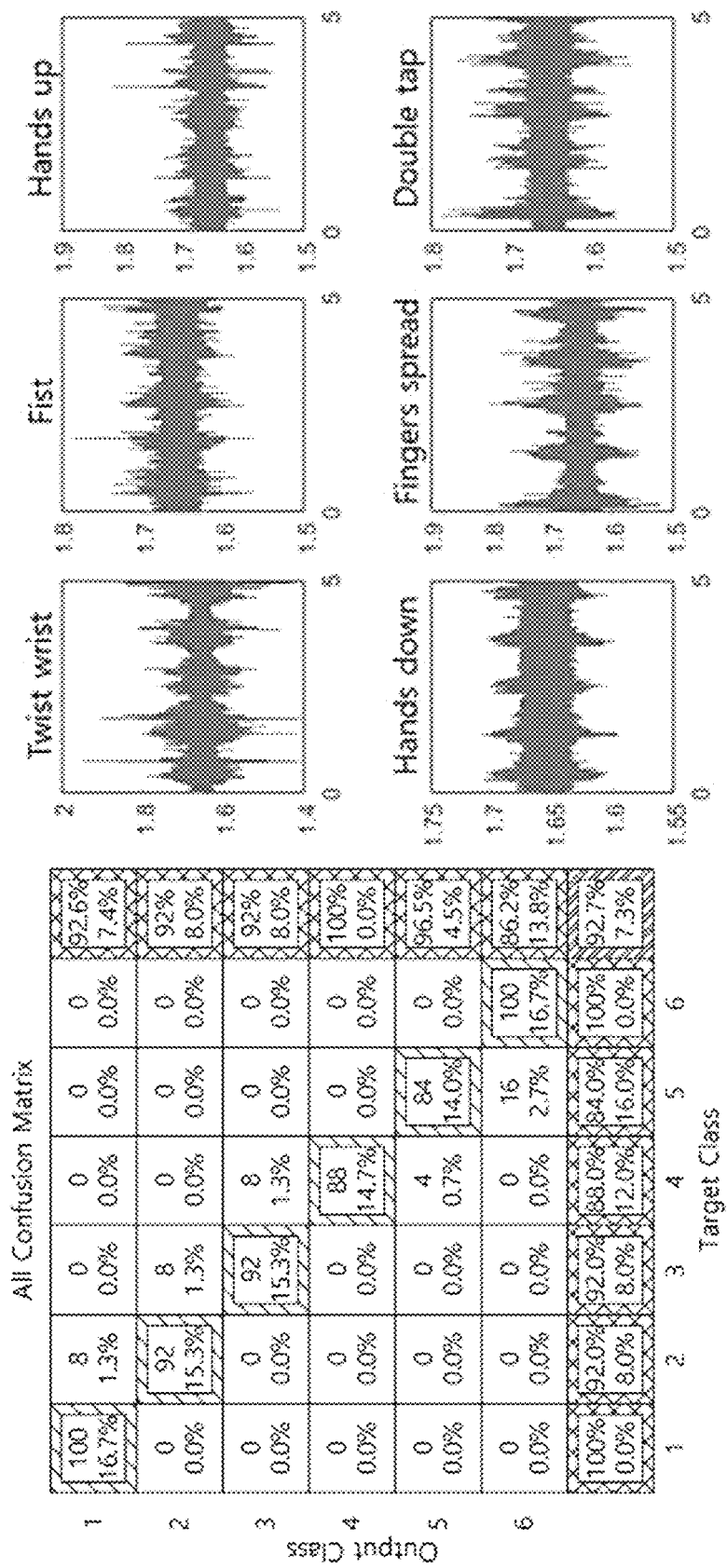
FIG. 4 is a view illustrating result values of hand gestures using parameters extracted from an EMG signal according to an embodiment of the present invention.
Figure 5:
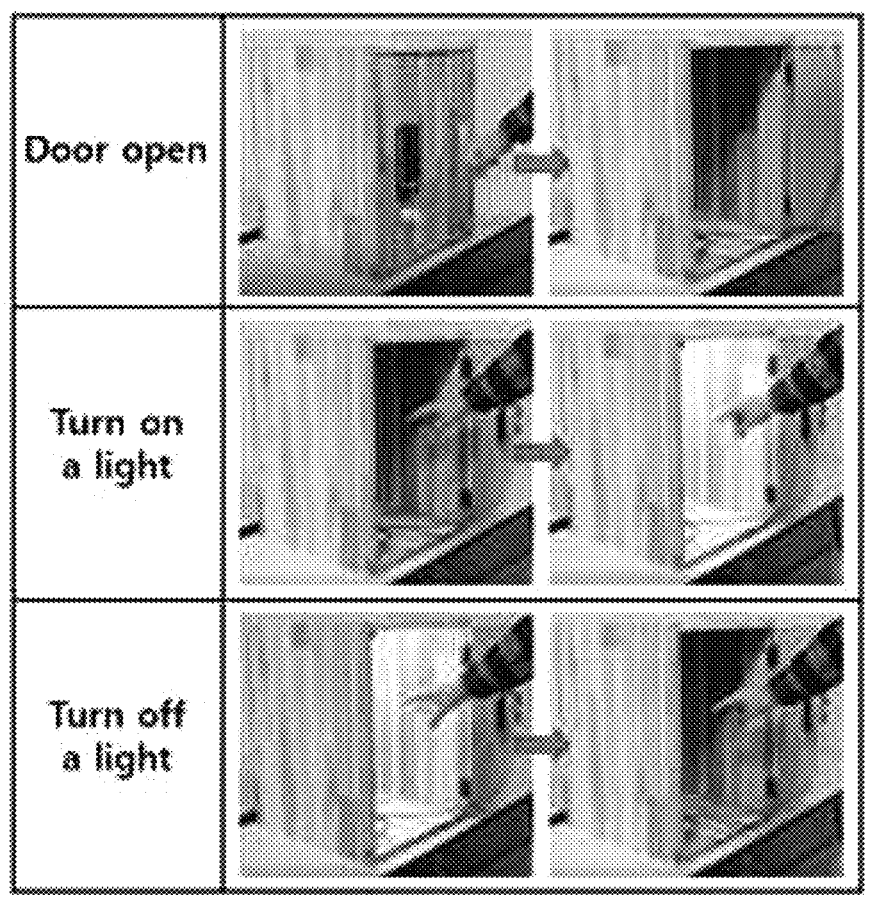
FIG. 5 is a view illustrating a door lock and a light which are controlled using hand gestures according to an embodiment of the present invention.

In addition, FIG. 4 is a view illustrating result values according to hand gestures using a parameter extracted from an EMG signal according to an embodiment of the present invention, and FIG. 5 is a view illustrating a door lock and a light which are controlled using a hand gesture according to an embodiment of the present invention.

Figure 6:
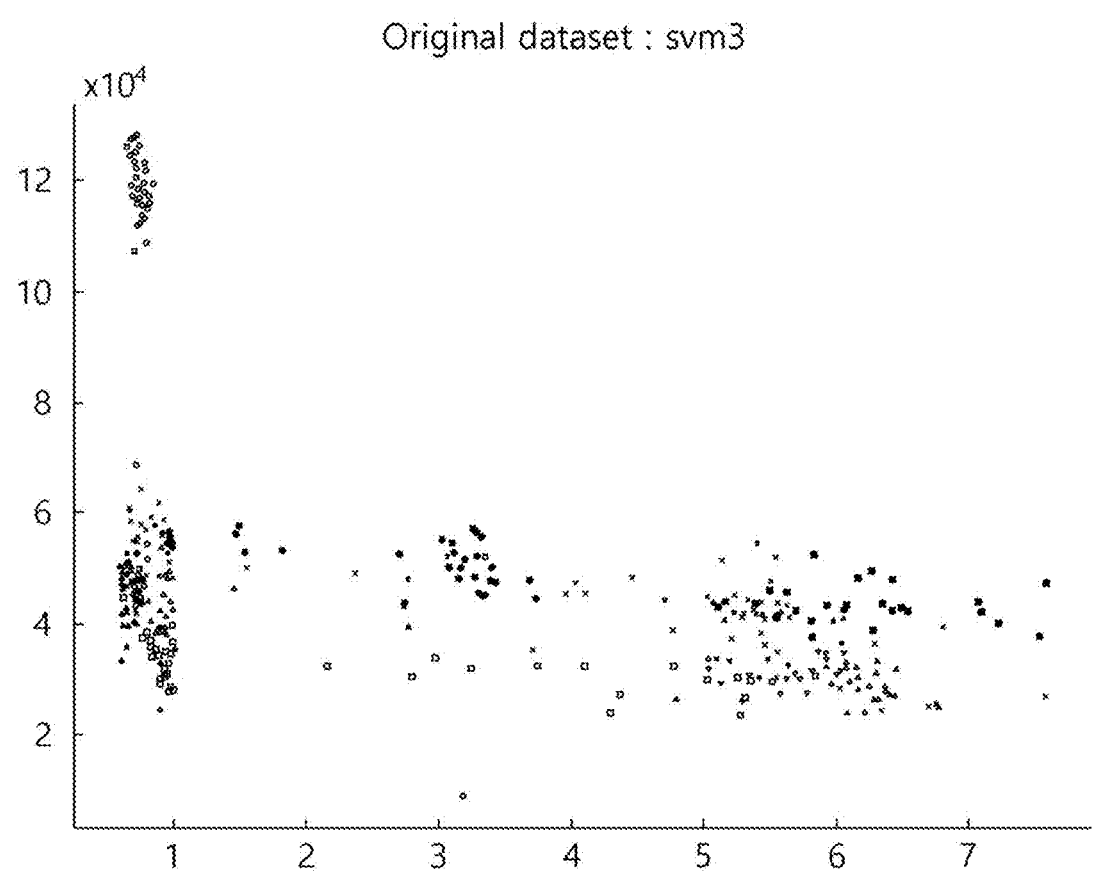
FIG. 6 is a view illustrating the distribution of EMG data according to an embodiment of the present invention.
Figure 7:
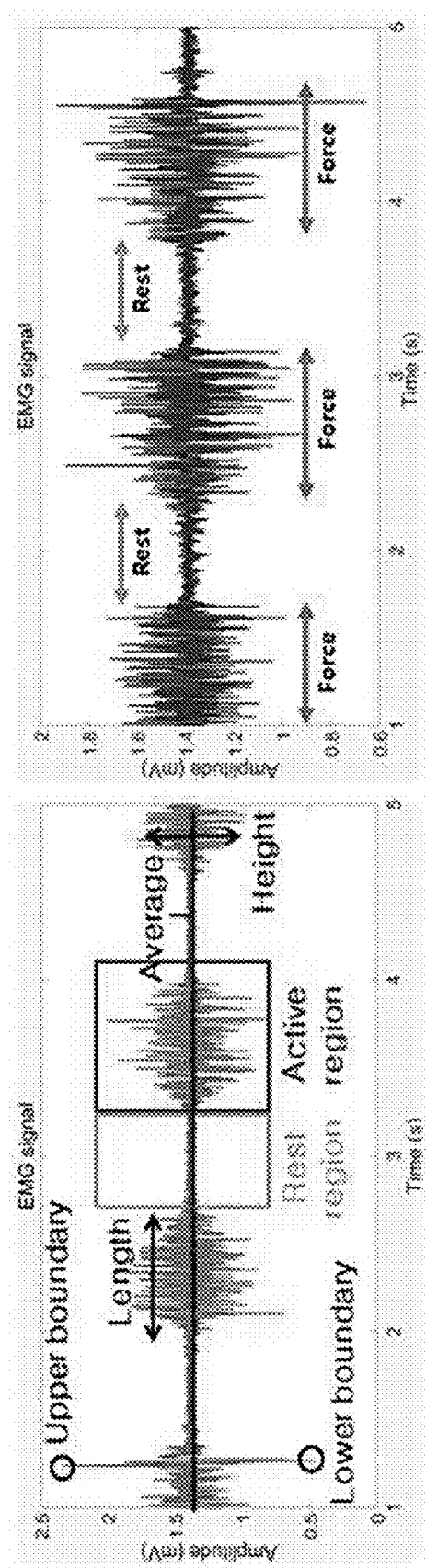
FIG. 7 is a view illustrating feature points of an EMG signal according to an embodiment of the present invention.

In addition, FIG. 6 is a view illustrating the distribution of EMG data according to an embodiment of the present invention, and FIG. 7 is a view illustrating feature points of an EMG signal according to an embodiment of the present invention.

Referring to FIGS. 1 to 7, a user authentication apparatus 100 may include an EMG signal receiver 110, a pre-processor 130, and a controller 150.

In one embodiment, the EMG signal receiver 110 may receive an EMG signal measured by an EMG sensor attached to a human body. In more detail, the EMG sensor may include two channels and a wet-type electrode. The EMG sensor acquires a signal through the two channels to thereby more accurately measure EMG signal and measure a micro EMG signal as well. The wet-type electrode included in the EMG sensor may be an electrode coated with a gel containing a hydrogel component.

For example, referring to FIG. 2, an EMG signal may be acquired through an EMG sensor with an electrode including two channels and attached to a lower arm part of the right arm. As for a hand gesture, various gestures such as clenching a first or spreading out all the fingers are repeatedly performed to acquire various signals for the same gesture. The example is merely for illustrative purposes, and the present invention is not limited thereto.

EMG is an electrical signal generated by contraction and relaxation of muscles when the body moves. The use of EMG signals may enable the movement of the body to be measured, and objects may be controlled through the movement of the body.

In one embodiment, the pre-processor 130 may remove a partial signal from the received EMG signal according to a preset frequency band. In more detail, the pre-processor 130 according to the embodiment of the present invention may remove a partial signal by designing a digital filter and applying the digital filter to an EMG signal measured through the EMG sensor. The received EMG signal may exist in a frequency band of 5 Hz to 450 Hz. In order to detect the signal in the frequency band, a Butterworth-type high pass filter and a low pass filter may be designed, and in order to reduce power noise of 60 Hz, a band pass filter may be used. The example is merely for illustrative purposes, and the present invention is not limited thereto.

In addition, referring to FIG. 3, an EMG module for receiving EMG signals may be configured as an analog circuit based on a Sallen-key filter. The Sallen-key filter has excellent filtering characteristics for processing signals and may amplify the signal magnitude at the same time as filtering occurs. Therefore, the use of a Sallen-key filter may enable a simple and high-performance circuit. The EMG module may be manufactured in a size of 57*35 mm. The example is merely for illustrative purposes, and the present invention is not limited thereto.

In one embodiment, the controller 150 may compare a pre-stored EMG signal with the EMG signal in which the partial signal has been removed through the pre-processor 130 to authenticate a user. In more detail, the controller 150 may derive parameters for analyzing the EMG signal from which the partial signal has been removed and compare result values of the derived parameters with reference values of parameters of the pre-stored EMG signal to authenticate the user.

In addition, the controller 150 inputs the result values of the derived parameters into a model combining an artificial neural network (ANN) and a support vector machine (SVM) to classify and store the result values of the derived parameters. The parameters are provided for hand gesture classification and personal authentication and may be extracted from the filtered EMG signal.

Here, the parameters include a first parameter (Integrated EMG (IEMG)), a second parameter (Waveform Length (WL)), a third parameter (Root Mean Square (RMS)), a fourth parameter (Simple Square Integral (SSI)), and a fifth parameter (Variance (VAR)).

In more detail, the first parameter, IEMG, which is a parameter related to the area of an EMG signal, may be a parameter used to estimate whether a muscle is used and a force exerted by the muscle. The equation of the first parameter, IEMG, is expressed as follows.

$$IEMG = \sum_{n=1}^{N} |x_n|$$

Here, $x_n$ refers to a value of the x-axis corresponding to n frequencies in a graph of an EMG signal from which a partial signal has been removed through the pre-processor 130.

In addition, the second parameter, WL, which is a parameter indicating the complexity of a surface EMG signal, may be a parameter related to the length in which EMG signal waveforms are accumulated for a predetermined time. The equation of the second parameter, WL, is expressed as follows.

$$WL = \sum_{n=1}^{N-1} |x_{n+1} - x_n|$$

Here, $x_n$ refers to a value of the x-axis corresponding to n frequencies in a graph of an EMG signal from which a partial signal has been removed through the pre-processor 130.

In addition, the third parameter, RMS, which is a parameter obtained by performing a square*average*square root calculation on an EMG signal, may be a variable that has a high association with the power of the EMG measurement object and may be a parameter related to the effective value of the EMG signal. The equation of the third parameter, RMS, is expressed as follows.

$$RMS = \sqrt{\frac{1}{N} \sum_{n=1}^{N} x_n^2}$$

Here, $x_n$ refers to a value of the x-axis corresponding to n frequencies in a graph of an EMG signal from which a partial signal has been removed through the pre-processor 130.

In addition, the fourth parameter, SSI, which is a parameter related to the energy of a surface electromyography, may be a parameter that indicates the cumulative value of the square value of the EMG signal. The equation of the fourth parameter, SSI, is as follows.

$$SSI = \sum_{n=1}^{N} |x_n|^2$$

Here, $x_n$ refers to a value of the x-axis corresponding to n frequencies in a graph of an EMG signal from which a partial signal has been removed through the pre-processor 130.

In addition, the fifth parameter, VAR, which is a variance value of the EMG signal, may be a parameter indicating the distribution of data. The equation of the fifth parameter, VAR, is expressed as follows.

$$VAR = \frac{1}{N-1} \sum_{n=1}^{N} x_n^2$$

Here, $x_n$ refers to a value of the x-axis corresponding to n frequencies in a graph of an EMG signal from which a partial signal has been removed through the pre-processor 130.

For example, values of parameters extracted from EMG data for personal authentication and object control are obtained, on average, with IEMG(2.51E-6) as a value of the first parameter, WL(3.7E+4) as a value of the second parameter, RMS(3.5E+5) as a value of the third parameter, SSI (4.59E-02) as a value of the fourth parameter, and VAR (3.97E-3) as a value of the fifth parameter. The measured average values may serve as reference values for authenticating a person in the next measurement. The example is merely for illustrative purposes, and the present invention is not limited thereto.

In addition, FIG. 4 is a graph according to an embodiment of the present invention that shows result values obtained by classifying hand gestures using parameters extracted from an EMG signal, and FIG. 5 is a view illustrating a door lock and a light which are controlled using recognized hand gestures according to an embodiment of the present invention. FIG. 6 is a view illustrating the distribution of EMG data according to an embodiment of the present invention that shows results values of EMG signal data acquired from fourteen users. FIG. 7 is a view illustrating feature points of an EMG signal according to an embodiment of the present invention, in which parameters are extracted from a measured EMG signal, a limit value is set from a raw EMG signal, and when the limit value is exceeded, an active area is determined. The example is merely for illustrative purposes, and the present invention is not limited thereto.

Figure 8:
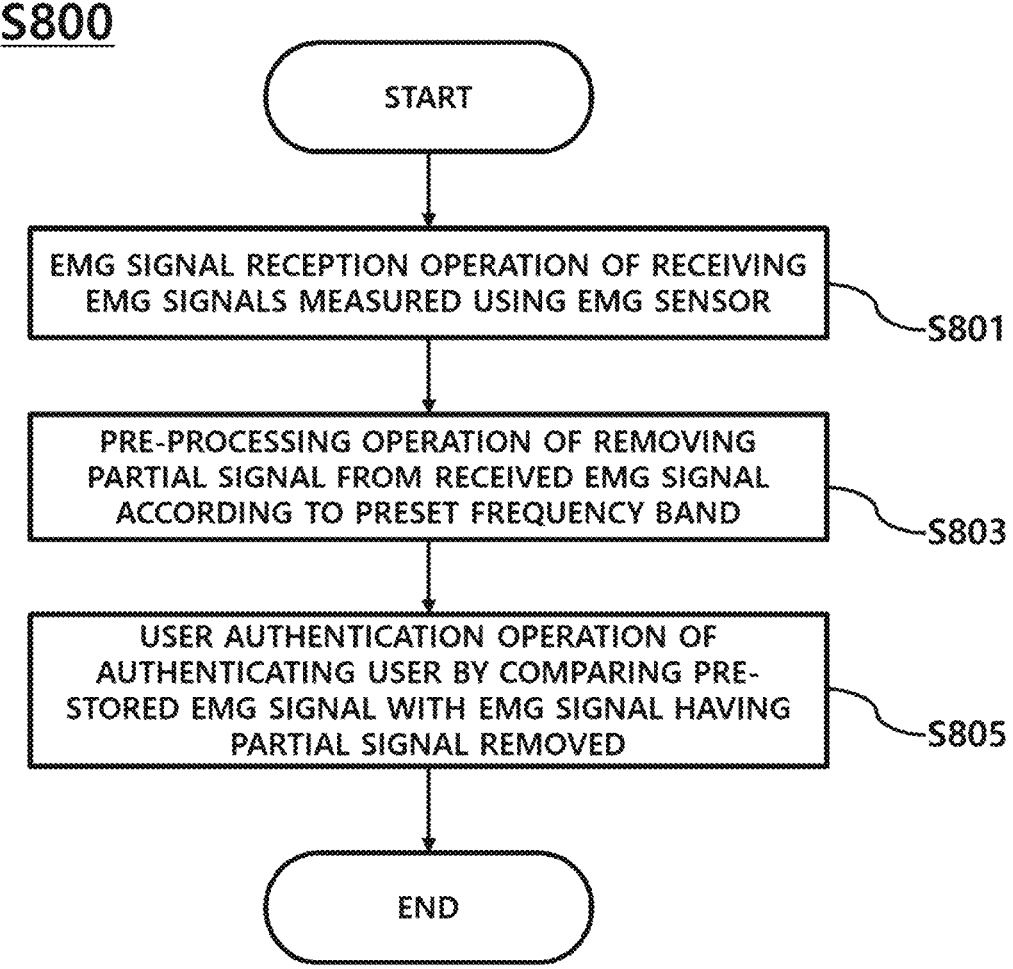
FIG. 8 is a flowchart showing an EMG signal-based user authentication method according to an embodiment of the present invention.
Figure 9:
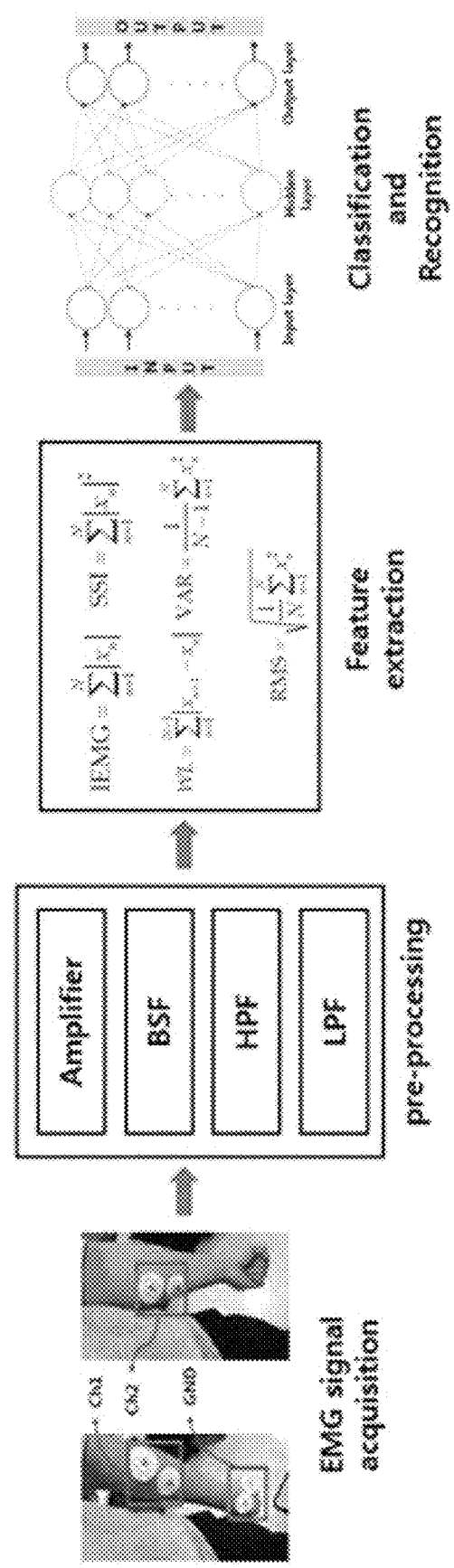
FIG. 9 is a view illustrating a process of authenticating an individual using an EMG according to an embodiment of the present invention.

FIG. 8 is a flowchart showing an EMG signal-based user authentication method according to an embodiment of the present invention, and FIG. 9 is a view illustrating a process of authenticating an individual using an EMG according to an embodiment of the present invention.

Referring to FIGS. 8 and 9, the user authentication method (S800) according to an embodiment of the present invention may include receiving an EMG signal measured using an EMG sensor (S801), performing pre-processing in which a partial signal is removed from the received EMG signal according to a preset frequency band (S803), and performing user authentication in which a pre-stored EMG signal is compared with the EMG signal in which the partial signal has been removed (S805).

In an embodiment, operation S801 of receiving the EMG signal may be an operation of receiving an EMG signal measured using an EMG sensor. In more detail, the EMG sensor may include two channels and a wet-type electrode. Since the EMG sensor acquires a signal through the two channels, the EMG signal may be more accurately measured and even a micro EMG signal may be measured. The wet-type electrode included in the EMG sensor may be an electrode coated with a gel containing a hydrogel component. EMG is an electrical signal generated by contraction and relaxation of muscles when the body moves. The use of EMG signals may enable the movement of the body to be measured, and objects may be controlled through the movement of the body.

In one embodiment, operation S803 of performing pre-processing may be an operation of removing a partial signal from the received EMG signal according to a preset frequency band.

In more detail, operation S803 may be an operation of removing a partial signal by applying a digital filter to an EMG signal measured through an EMG sensor of a device that has designed the digital filter. The EMG signal received in operation S801 may exist in a frequency band of 5 Hz to 450 Hz. In order to detect the signal in the frequency band, a Butterworth-type high pass filter and a low pass filter may be designed, and in order to reduce power noise of 60 Hz, a band pass filter may be used. The example is merely for illustrative purposes, and the present invention is not limited thereto.

In one embodiment, operation S805 of performing user authentication may be an operation of authenticating a user by comparing a pre-stored EMG signal with the EMG signal in which the partial signal has been removed. In more detail, operation S805 may be an operation of deriving parameters for analyzing the EMG signal in which the partial signal has been removed, and comparing result values of the derived parameters with reference values of parameters of the pre-stored EMG signal to authenticate a user.

In addition, operation S805 may be an operation of inputting the result values of the derived parameters into a model combining an Artificial Neural Network (ANN) and a Support Vector Machine (SVM) to classify and store the result values of the derived parameters. The parameters are provided for hand gesture classification and personal authentication and may be extracted from the filtered EMG signal.

Here, the parameters include a first parameter (IEMG), a second parameter (WL), a third parameter (RMS), a fourth parameter (SSI), and a fifth parameter (VAR).

In more detail, the first parameter, IEMG, which is a parameter related to the area of an EMG signal, may be a parameter used to estimate whether a muscle is used and a force exerted by the muscle. The equation of the first parameter, IEMG, is expressed as follows.

$$IEMG = \sum_{n=1}^{N} |x_n|$$

Here, $x_n$ refers to a value of the x-axis corresponding to n frequencies in a graph of an EMG signal from which a partial signal has been removed through operation S803 of pre-processing.

In addition, the second parameter, WL, which is a parameter indicating the complexity of a surface EMG signal, may be a parameter related to the length in which EMG signal waveforms are accumulated for a predetermined time. The equation of the second parameter, WL, is expressed as follows.

$$WL = \sum_{n=1}^{N-1} |x_{n+1} - x_n|$$

Here, $x_n$ refers to a value of the x-axis corresponding to n frequencies in a graph of an EMG signal from which a partial signal has been removed through operation S803 of pre-processing.

In addition, the third parameter, RMS, which is a parameter obtained by performing a square*average*square root calculation on an EMG signal, may be a variable that has a high association with the power of the EMG measurement object and may be a parameter related to the effective value of the EMG signal. The equation of the third parameter, RMS, is expressed as follows.

$$RMS = \sqrt{\frac{1}{N}\sum_{n=1}^{N} x_n^2}$$

Here, $x_n$ refers to a value of the x-axis corresponding to n frequencies in a graph of an EMG signal from which a partial signal has been removed through operation S803 of pre-processing.

In addition, the fourth parameter, SSI, which is a parameter related to the energy of a surface electromyography, may be a parameter that indicates the cumulative value of the square value of the EMG signal. The equation of the fourth parameter, SSI, is as follows.

$$SSI = \sum_{n=1}^{N} |x_n|^2$$

Here, $x_n$ refers to a value of the x-axis corresponding to n frequencies in a graph of an EMG signal from which a partial signal has been removed through operation S803 of pre-processing.

In addition, the fifth parameter, VAR, which is a variance value of the EMG signal, may be a parameter indicating the distribution of data. The equation of the fifth parameter, VAR, is expressed as follows.

$$VAR = \frac{1}{N-1}\sum_{n=1}^{N} x_n^2$$

Here, $x_n$ refers to a value of the x-axis corresponding to n frequencies in a graph of an EMG signal from which a partial signal has been removed through operation S803 of pre-processing.

For example, values of parameters extracted from EMG data for personal authentication and object control are obtained, on average, with IEMG(2.51E-6) as a value of the first parameter, WL(3.7E+4) as a value of the second parameter, RMS(3.5E+5) as a value of the third parameter, SSI (4.59E-02) as a value of the fourth parameter, and VAR (3.97E-3) as a value of the fifth parameter. The measured average values may serve as reference values for authenticating a person in the next measurement. The example is merely for illustrative purposes, and the present invention is not limited thereto.

As is apparent from the above, EMG signals are received through two channels so that micro signals can be more clearly distinguished, thereby improving the accuracy of signal measurement.

In addition, according to the embodiment of the present invention, security loopholes related to personal authentication can be complemented, and the availability thereof can be improved in combination with smartwatches that are being increasingly used.

The advantages of the present invention are not limited to the above, and potential advantages effects expected by the technical features of the present invention may be apparent to those of ordinary skill in the art based on the detailed description.

Although the exemplary embodiments of the present invention have been disclosed for illustrative purposes, those skilled in the art will appreciate that various modifications, additions and substitutions are possible without departing from the scope and spirit of the invention as disclosed in the accompanying claims.

Therefore, the embodiments disclosed in this specification are intended to illustrate and not limit the technical spirit of the present invention, and the scope of the present invention is not limited by these embodiments.

The scope of the present invention should be interpreted by the appended claims of the present invention, and the present invention is to cover all modifications, equivalents, and alternatives falling within the spirit and scope of the present invention.

What is claimed is:

1. A user authentication apparatus comprising:
an electromyogram (EMG) signal receiver configured to receive an EMG signal measured using an EMG sensor;
a pre-processor configured to remove a partial signal from the received EMG signal according to a preset frequency band; and
a controller configured to authenticate a user by comparing a pre-stored EMG signal with the EMG signal in which the partial signal has been removed,
wherein the EMG signal is a signal measured using the EMG sensor including a first channel-electrode, a second channel-electrode, and a ground electrode,
each of the first and second channel-electrodes is a wet-type electrode coated with a gel containing a hydrogel component,
the first and second channel-electrodes are configured to be separately attached to a lower arm part of an arm of the user, and
the ground electrode is configured to be attached to a back of a hand of the user.

2. The user authentication apparatus of claim 1, wherein the controller derives parameters for analyzing the EMG signal in which the partial signal has been removed and compares result values of the derived parameters with reference values of parameters of the pre-stored EMG signal to authenticate the user.

3. The user authentication apparatus of claim 2, wherein the controller inputs the result values of the derived parameters into a model combining an Artificial Neural Network (ANN) and a Support Vector Machine (SVM) to classify and store the result values of the derived parameters.

4. The user authentication apparatus of claim 2, wherein the parameters include a first parameter, a second parameter, a third parameter, a fourth parameter, and a fifth parameter,
wherein the first parameter is a parameter related to an area of the EMG signal,
the second parameter is a parameter related to a length in which EMG signal waveforms are accumulated for a predetermined time,
the third parameter is a parameter related to an effective value of the EMG signal,
the fourth parameter is a parameter related to a cumulative value of a square value of the EMG signal, and
the fifth parameter is a parameter related to a variance value of the EMG signal.

5. The user authentication apparatus of claim 1, wherein the pre-processor comprises a digital filter configured to be applied to the received EMG signal, and the digital filter comprises a Butterworth-type high pass filter, a low pass filter, and a band pass filter.

6. The user authentication apparatus of claim 1, wherein the pre-processor comprises a Sallen-key filter configured to be applied to the received EMG signal.

7. The user authentication apparatus of claim 4, wherein:
the first parameter is Integrated EMG (IEMG), which is expressed as:

$$IEMG = \sum_{n=1}^{N} |x_n|,$$

where $x_n$ is a value of a x-axis corresponding to n frequencies in a graph of the EMG signal from which the partial signal has been removed through the pre-processor;
the second parameter is Waveform Length (WL), which is expressed as:

$$WL = \sum_{n=1}^{N-1} |x_{n+1} - x_n|,$$

where $x_n$ is a value of the x-axis corresponding to n frequencies in the graph of the EMG signal from which the partial signal has been removed through the pre-processor;
the third parameter is a Root Mean Square (RMS), which is expressed as:

$$RMS = \sqrt{\frac{1}{N}\sum_{n=1}^{N} x_n^2},$$

where $x_n$ is a value of the x-axis corresponding to n frequencies in the graph of the EMG signal from which the partial signal has been removed through the pre-processor;
the fourth parameter is Simple Square Integral (SSI), which is expressed as:

$$SSI = \sum_{n=1}^{N} |x_n|^2,$$

where $x_n$ is a value of the x-axis corresponding to n frequencies in the graph of the EMG signal from which the partial signal has been removed through the pre-processor; and the fifth parameter is Variance (VAR), which is expressed as:

$$VAR = \frac{1}{N-1} \sum_{n=1}^{N} x_n^2,$$

where $x_n$ is a value of the x-axis corresponding to n frequencies in the graph of the EMG signal from which the partial signal has been removed through the pre-processor.

8. A user authentication method comprising:
an EMG signal reception operation of receiving an EMG signal measured using an EMG sensor;
a pre-processing operation of removing a partial signal from the received EMG signal according to a preset frequency band; and
a user authentication operation of comparing a pre-stored EMG signal with the EMG signal having the partial signal removed to authenticate a user,
wherein the EMG signal is a signal measured using the EMG sensor including a first channel-electrode, a second channel-electrode, and a ground electrode,
each of the first and second channel-electrodes is a wet-type electrode coated with a gel containing a hydrogel component,
the first and second channel-electrodes are configured to be separately attached to a lower arm part of an arm of the user, and
the ground electrode is configured to be attached to a back of a hand of the user.

9. The user authentication method of claim 8, wherein the user authentication operation comprises:
deriving parameters for analyzing the EMG signal in which the partial signal has been removed; and
comparing result values of the derived parameters with reference values of parameters of the pre-stored EMG signal to authenticate the user.

10. The user authentication method of claim 9, wherein the user authentication operation comprises:
inputting the result values of the derived parameters into a model combining an Artificial Neural Network (ANN) and a Support Vector Machine (SVM); and
classifying and storing the result values of the derived parameters.

11. The user authentication method of claim 9, wherein the parameters include a first parameter, a second parameter, a third parameter, a fourth parameter, and a fifth parameter,
wherein the first parameter is a parameter related to an area of the EMG signal,
the second parameter is a parameter related to a length in which EMG signal waveforms are accumulated for a predetermined time,
the third parameter is a parameter related to an effective value of the EMG signal,
the fourth parameter is a parameter related to a cumulative value of a square value of the EMG signal, and
the fifth parameter is a parameter related to a variance value of the EMG signal.

12. The user authentication method of claim 8, wherein the pre-processing operation comprises applying a digital filter to the received EMG signal, and wherein the digital filter comprises a Butterworth-type high pass filter, a low pass filter, and a band pass filter.

13. The user authentication method of claim 8, wherein the pre-processing operation comprises applying a Sallen-key filter to the received EMG signal.

14. The user authentication method of claim 11, wherein:
the first parameter is Integrated EMG (IEMG), which is expressed as:

$$IEMG = \sum_{n=1}^{N} |x_n|,$$

where $x_n$ is a value of a x-axis corresponding to n frequencies in a graph of the EMG signal from which the partial signal has been removed through the pre-processing,
the second parameter is Waveform Length (WL), which is expressed as:

$$WL = \sum_{n=1}^{N-1} |x_{n+1} - x_n|,$$

where $x_n$ is a value of the x-axis corresponding to n frequencies in the graph of the EMG signal from which the partial signal has been removed through the pre-processing;
the third parameter is a Root Mean Square (RMS), which is expressed as:

$$RMS = \sqrt{\frac{1}{N} \sum_{n=1}^{N} x_n^2},$$

where $x_n$ is a value of the x-axis corresponding to n frequencies in the graph of the EMG signal from which the partial signal has been removed through the pre-processing;
the fourth parameter is Simple Square Integral (SSI), which is expressed as:

$$SSI = \sum_{n=1}^{N} |x_n|^2,$$

where $x_n$ is a value of the x-axis corresponding to n frequencies in the graph of the EMG signal from which the partial signal has been removed through the pre-processing; and
the fifth parameter is Variance (VAR), which is expressed as:

$$VAR = \frac{1}{N-1} \sum_{n=1}^{N} x_n^2,$$

where $x_n$ is a value of the x-axis corresponding to n frequencies in the graph of the EMG signal from which the partial signal has been removed through the pre-processing.

* * * * *